UNITED STATES PATENT OFFICE.

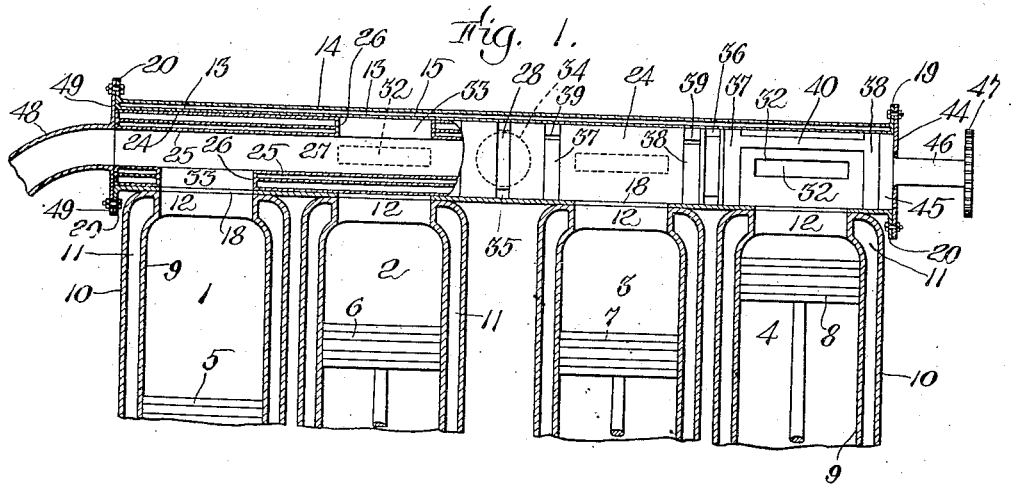

HENRY H. GOVE, OF BIDDEFORD, MAINE, ASSIGNOR OF ONE-HALF TO JOHN F. DEAN, OF BIDDEFORD, MAINE.

ROTARY VALVE FOR INTERNAL-COMBUSTION ENGINES.

1,251,769.

Specification of Letters Patent.

Patented Jan. 1, 1918.

Application filed April 10, 1914. Serial No. 830,906.

*To all whom it may concern:*

Be it known that I, HENRY H. GOVE, a citizen of the United States, and resident of Biddeford, county of York, State of Maine, have invented an Improvement in Rotary Valves for Internal-Combustion Engines, of which the following description, in connection with the accompanying drawings, is a specification, like letters on the drawings representing like parts.

My present invention is an improved rotary valve mechanism for internal combustion engines, and the object of the invention is to improve and perfect such valve construction. I prefer to form my improved rotary valve with concentric passages, one for the supply or intake of gaseous fuel, and the other for the exhaust, and also to so arrange the same that the simple rotation of the valve will automatically take care of the fuel supply and the exhaust from the same port in the engine cylinder. Heretofore in rotary valve mechanisms it has been customary to employ either two separate rotary valves, one to control the supply of fuel and one to control the exhaust, or to have a plurality of ports opening into each engine cylinder, thereby greatly complicating the mechanism to operate and control the ports, as well as rendering it extremely difficult to make such ports and valve "compression tight." A further important object of my present invention is to so construct a rotary valve, particularly for an engine having a plurality of cylinders, that any expansion in the valve mechanism due to heating of the metal during use and at high speeds, will be automatically compensated for by providing means to allow for such expansion without danger of heating the valve bearings or causing the valve to "stick." I accomplish this by arranging annular grooves in the outer bearing wall or face of my rotary valve, said outer face contacting with the corresponding inner wall of the casing inclosing said valve, these annular grooves dividing the bearing surface into short longitudinal sections. Thus each section can expand or contract irrespective of the adjacent section and without binding or sticking due to the expansion when the valve is "heating up." This feature is of especial importance, insuring a smooth, even running of the valve, and hence correspondingly satisfactory running of the engine. By having the exhaust passage on the inner sleeve where there are no bearings to become heated, the expansion or contraction of the exhaust walls in my valve do not have to be compensated for, as just explained in connection with the outer wall. Still further objects of the invention are to provide a simple construction of rotary valve, particularly capable of controlling both supply and exhaust through a single port in a cylinder, or each of a plurality of cylinders, together with a novel form of means to insure each port in the valve being "compression tight" entirely around the port;—to simplify the water circulation in an engine; and to enable an economical construction of rotary valve to be built and applied to any number of engine cylinders; also to provide means to prevent the accumulation of carbon within the valve casing, as well as to remove or shear off any carbon or the like which accumulates.

Other features of the invention, novel combinations of parts, and details of construction, will be hereinafter more fully pointed out and claimed.

Referring to the drawings, illustrating a preferred embodiment of my present invention, Figure 1 is a side view, mainly in section, of an internal combustion engine, comprising four cylinders with my improved form of rotary valve therein;

Fig. 2 is a cross sectional view through the rotary valve and one of the cylinders at the port from said cylinder showing the same opening into the exhaust passage of the rotary valve;

Fig. 3 is a detail view of a portion of the rotary valve adjacent two ports therein, showing the provision for rendering said ports compression tight;

Fig. 4 is a perspective view of the compression ring and bar, adapted to fit on the section illustrated in Fig. 3; and Fig. 5 is a diagrammatic view, illustrating the improved simple form of water circulation which I employ.

In the drawings I have illustrated in conventional form the upper portions of a four cylinder internal combustion engine, said cylinders being indicated at 1, 2, 3, and 4 respectively, in which pistons 5, 6, 7, and 8 respectively are adapted to reciprocate, having piston rods connected with the usual crank shaft (not shown). Each cylinder comprises inner walls 9 and outer walls 10 inclosing the annular spaces and passages 11 for water circulation, thus constituting the usual water jacket construction.

I prefer to affix my rotary valve construction across the top or upper ends of the cylinders constituting the engine herein illustrated, although it is, of course, feasible to arrange my rotary valve along one side, if such construction is desirable for any special purpose. As illustrated in the drawings, I provide through the uppermost portion of each cylinder, a single port 12, preferably being in the form of an elongated slot, and being relatively of large dimensions proportionately to the cylinder to enable a very quick and effectual intake, as well as an equally thorough and speedy exhaust therethrough. I prefer to construct my rotary valve mechanism and the casing therefor as a substantially continuous member, fitting across the top of the entire series of cylinders comprising the engine and top, of a suitable length for such engine, and to form the casing of concentric inner and outer walls 13 and 14 respectively inclosing the space 15 for water circulation being a similar water jacketed construction to that explained for each cylinder. The water jacket 15 is preferably in communication with the spaces 11 through ports 16 at suitable places in the outer wall 14 of the valve casing and corresponding ports 17 in the outer walls 10 of each cylinder, as clearly shown in Fig. 2. A port 18 through the walls 13 and 14 of the valve casing adapted to register with each port 12 in the cylinder and of corresponding length and breadth is provided, thus constituting a continuation of the port 12 in each cylinder. At each end of the valve casing I provide rightangled flanges 19 and 20, said flanges also uniting the parallel walls 13 and 14 to thereby inclose the water space 15 permitting the latter free circulation throughout the length and circumference of the valve casing. On the outer wall 14 of the valve casing at suitable intervals, are cast lugs 21, bored to receive bolts 22, which bolts are threaded into appropriately tapped sockets 23 in the top walls of each cylinder, as illustrated in Fig. 2. By this simple means the valve casing is firmly and rigidly united to each of the cylinders constituting the engine for which a particular valve is intended, and thus permits of quick attachment or removal of the valve mechanism.

Within the valve casing the rotary valve is fitted, being easily slid into position from either end when the valve casing has been affixed to the tops of the engine cylinders, as previously described. This rotary valve comprises a plurality of concentric passages, one for the supply of fuel and one for the exhaust. I prefer to form the valve with the supply passage adjacent the outer wall with the exhaust going through the central opening in the valve, thus keeping the outer wall of the valve cool through the supply of fresh gases and confining the heat of the exhaust to the inner central passage through the valve. This prevents distortion through expansion by undue heat, of the outer wall of my rotary valve, which outer wall is rotated within the inner surface of the wall 13 of the casing and insures even running and a long life to the valve. My rotary valve comprises the outer wall 24 adapted to fit within the interior 13 of the casing and to rotate therein and an inner wall or sleeve 25, these two walls being united by vertical partitions 26 constituting a port in the rotary valve through its walls to the inner or exhaust passage 27, this passage constituting a port of same dimensions as the slots 12 and 18 already described and in position to register therewith during rotation of the valve. These walls 26 unite the inner and outer sleeves at a plurality of places throughout the length of the valve, and therefore render it feasible to separate the outer sleeve 24 into longitudinal sections by the annular grooves or passages as indicated at 35 and 36, Fig. 1, as will be explained. I prefer also to provide an intermediate concentric wall or sleeve 28 to give an air space 29 between the central exhaust passage 27 and the enveloping supply annular passage 30, thus further providing means to prevent undue heating by the exhaust of the outer wall 24 of the valve. This air passage 29 may be also extended throughout the extent of the partitions 26 around each port, as shown at 31, see Fig. 2. Suitable supply ports 32 are formed through the outer wall 24 in proper position and of appropriate extent to register with the ports 12 and 18 during the rotation of the valve, so as to be timed properly for the operation of each cylinder, and at the proportional distance from each adjacent exhaust port 33. In the operation of the valve, a supply of fuel is admitted to the annular intake passage 30, and during the continuous rotation of the valve in its casing,—as will be described,—the supply port 32 comes into register with the engine cylinder ports 12 and 18 admitting a supply of fuel into the interior of each cylinder during the downward or suction movement of the piston, immediately after a prior exhaust. Further rotation of the valve 32 closes the port openings 12 and 18 and maintains the same closed during the successive compression and firing of the charge so drawn in and the successive upward and downward reciprocations of the piston. After the firing stroke of the piston, the exhaust port 33 is brought into register with the port openings 12 and 18 and conducts the consumed gases into the central exhaust passage 27 and out to a muffler at the end of the valve.

In a four cylinder engine as illustrated in the drawings I prefer to affix the supply pipe at a point substantially midway in the length of the valve, said supply pipe being indicated in dotted lines at 34 in Fig. 1, a suitable port being provided therefor through the casing walls 14 and 13, so that the supply will be admitted directly into the interior of the valve casing. At this point I also prefer to cut an annular slot 35 entirely through the outer wall 24 of the rotary valve member, so that the supply of fuel through the pipe 34 will be admitted through the slot 35 and into the annular passage 30 either side of said slot, and during the continued rotation of the valve. The supply gases therefore following through the pipe 34 and into said slot strike against the outer surface of the intermediate wall 28 and flow toward either end of said passage 30. The various partitions 26 uniting the walls 24 and 25 around the several port openings constitute ample means for uniting the inner and outer concentric walls of the rotary sleeve and permitting the annular slot 35 to be formed without unduly weakening the valve; although a series of holes, overlapping angular grooves or the like, could be provided in place of the slot 35, as well-known equivalents thereof if desired. The provision of the slot 35 enables the outer wall 24 of my rotary valve construction to expand and contract without binding the valve in its bearings, in case of excessive heating and is an important feature in enabling a practicable rotary valve construction to be provided which will operate at high speeds, as well as at low speed, satisfactorily. If desired, I may form a plurality of such annular slots 35, an additional slot being shown at 36 to thereby still further allow for expansion and contraction without undue binding of the rotary valve in its bearing.

In addition to the allowance for expansion and contraction by such slots, the formation of a rotary valve in sections eliminates all danger of warping, as each section is relatively short, compared with the total length of a valve running adjacent a four, six or eight cylinder engine, for example. Overcoming this tendency to warp, as well as providing for the compensating expansion and contraction in the valve bearings, further insure the smooth running of the valve.

In order to provide means to render the ports "compression tight", both at the ends of said ports between adjacent cylinders and along the sides of such ports, between adjacent intake and exhaust ports, operating successively on each cylinder, I have devised a novel form of compression ring and member. This device comprises a pair of expansible rings 37 and 36 with an overlapping scarf at 39, see Fig. 4, said rings being preferably integrally united with a bar 40. These rings are made expansible to any degree of tension desired, having the portion adjacent the bar 40 of slightly thicker metal than that at the scarf 39, thus expanding the rings at the scarfing and tending to force the bar 40 constantly outwardly. To fit this compression ring and bar in the outer wall 24 of the rotary sleeve between the supply and exhaust ports 32 and 33 in said sleeve, I cut grooves 41, 42, and 43 substantially as illustrated in Fig. 3, the grooves 41 and 42 being adapted to receive the rings 38 and 37 and have them sprung into shape, while the groove 43 is of appropriate depth to receive the cross bar 40. If desired, of course, a plurality of cross bars 40 could be supplied enveloping the ports 32 and 33, but in the preferred form I utilize a single cross bar 40 to insure a compression tight joint in the short space between the two ports. In addition to the function of making the ports compression-tight, the cross-bar 40 and its expansible feature performs the very important action of preventing the accumulation of carbon within the valve casing, or if any carbon is formed therein, the bar 40 acts to shear or clean the same from the interior of the casing automatically. Said bar being constantly forced outwardly against the inner walls of the casing necessarily scrapes the same smooth, while bearing tightly against the wall and automatically seating firmly and tightly throughout its entire length. This cross-bar also acts to maintain an even distribution of oil around the bearing faces of the valve and the wall of the inclosing casing. This combined action of carbon prevention and shearing, oil distribution, and "compression-tight" features, I have found are most important in practice and insure the smooth, uniform and satisfactory operation of my rotary valve and the engine cylinders controlled by it.

With the rotary valve slid into place within the valve casing, as above described, I prefer to retain the same in place by the simple expedient of an annular washer 44 at one end of sufficient breadth to cover the end of the valve 45 and to be bolted to the flange 19 of the casing. The washer 44 has a central opening to receive the shaft 46 united to the valve in any suitable manner and carrying on its outer end a sprocket wheel 47, which may be geared in proper ratio to a corresponding sprocket on the main crank shaft to rotate the valve, as will be readily understood. At the other end of the valve and casing I prefer to form the exhaust outlet pipe 48 with a flange 49 of suitable extent to be bolted to the flange 20 and to act as an end bearing on the rotary valve, the opening in the pipe 48 being of similar diameter to the exhaust opening 27. Rotation of the sprocket wheel 47 in proper geared relation similarly rotates the valve within its bearing formed by the casing 13, and successively brings the supply and exhaust ports for each cylinder into operation as above explained, said ports being staggered about the circumference of the rotary valve to secure the desired timing of the several cylinders.

I may prefer to arrange the top of the outer casing forming the water jacket slightly inclined, as illustrated in diagrammatic form in Fig. 5, to eliminate the water manifold, and provide a direct connection with the top of the usual front radiator 50. A suitable connection from the radiator to any bottom portion of the water jacket 11 around the adjacent cylinder 4 serves to give a proper circulation throughout the entire water jacketed passages 11 and 15. The inclined portion of the jacket casing is necessary only for the outer or top part, as will be readily understood on reference to Fig. 5.

It will also be understood that any suitable oiling devices can be supplied to the outer valve casing through the walls 13 and 14 into the bearing between the inner face 13 and the outer surface 24 of the rotary valve, preferably a plurality of oil cups arranged at one side along the length of the valve casing being supplied to furnish lubrication; furthermore the spark plugs will be fitted to the cylinders at convenient positions, such construction being of any wellknown or appropriate type and not constituting a part of the present invention has not been herein illustrated. In a four cycle engine, such as is illustrated in the drawings, the gear ratio between the main crank shaft and the rotating valve shaft will be as 2 to 1.

Having described my invention, what I claim as new and desire to secure by Letters Patent is:

1. A hollow rotary valve for internal combustion engines having a longitudinal exhaust pipe therethrough, a port opening from said exhaust pipe through the exterior of the rotary valve, in position to register with the exhaust port of a cylinder, circumferential recesses in the outer valve walls adjacent two sides of the exhaust port, a single longitudinal recess adjacent a third side of said port connecting the two circumferential recesses, and a combined carbon shearing, compression packing, and oil distributing member housed within said recesses, consisting in a single squared crossbar fitting within the longitudinal recess and having expansible split rings adapted to fit within said circumferential recesses, said crossbar having a sharp carbon shearing edge held in carbon scraping position by the expansion of said rings.

2. A hollow rotary valve for internal combustion engines having a plurality of interior passages, separate ports opening from separate passages therein, and in line with each other, one of said connecting ports and passages to supply fuel and the other to receive the exhaust from a cylinder, both ports being in line with each other during the rotation of the valve, and an automatic packing device arranged between said ports and comprising automatic expansible rings rigidly united by a bar adapted to be housed within a corresponding depression in the outer face of the valve.

In testimony whereof I have signed my name to this specification in the presence of two subscribing witnesses.

HENRY H. GOVE

Witnesses:
 EDWILDA CUSTEAU,
 H. G. HUTCHINSON.